March 26, 1968  B. H. TOWNSEND  3,375,047
CONTAINER FOR ROPE LARIAT
Filed Feb. 17, 1964
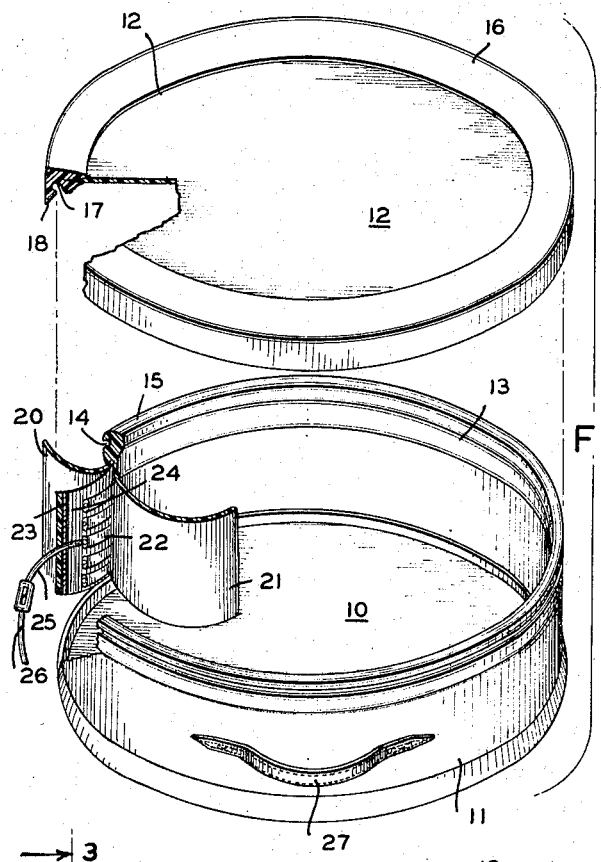
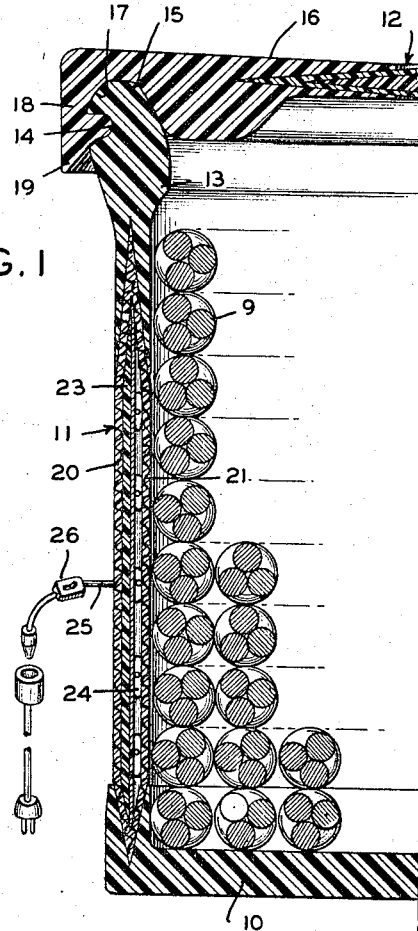
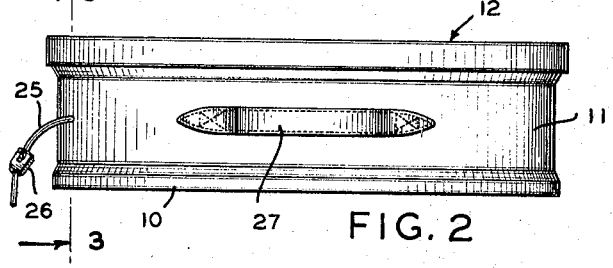
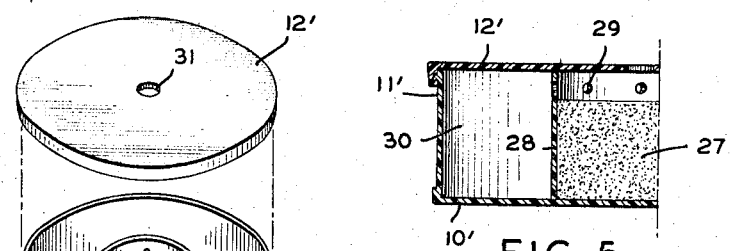
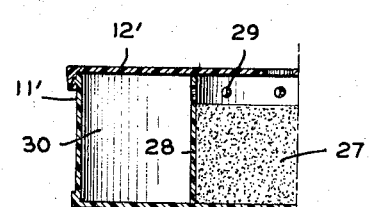
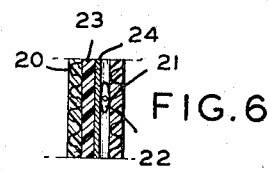
INVENTOR
B. H. TOWNSEND
BY
ATTORNEY United States Patent Office 3,375,047
Patented Mar. 26, 1968

3,375,047
CONTAINER FOR ROPE LARIAT
Blue H. Townsend, 2400 N. 49th, Waco, Tex. 76710
Filed Feb. 17, 1964, Ser. No. 345,351
9 Claims. (Cl. 312—31)

ABSTRACT OF THE DISCLOSURE

A container for drying lariats or the like including a cylindrical wall having an axis of lesser length than the diameter and defining a chamber for receiving a lariat, a top for tightly closing the container, tongue-and-groove seal means for removably holding the top of the container, and a drying element arranged within the bag and having cylindrical drying surface walls facing the lariat holding chamber. In one embodiment, the cylindrical drying element is an electric heater mounted between polyethylene impregnated layers forming the cylindrical wall of the container with an insulating layer having a heat reflecting surface arranged to direct heat onto the lariat. In another embodiment, the cylindrical drying element is a cylindrical bag containing a desiccant located in the center of the lariat container.

---

This invention relates to ropes or cables of various kinds used in various ways, including as lariats or lassoes in rodeos and other public performances, as well as in general use in connection with the herding of cattle and other animals and in the care and control thereof.

The invention is concerned particularly with the care and maintenance of ropes used as lariats, including a bag or container to insure their being kept in proper condition with the necessary moisture content, neither too wet nor too dry, which variation could result in change of weight and flexibility and affect ease of manipulation.

The use of rope lariats in various ways, including in the roundup of cattle and other animals, and in public performances and elsewhere, has been practiced with great skill and proficiency, influenced substantially by the moisture content of the rope. Sometimes such ropes when coiled and tied to saddles become damp and wet and when dried become stiff. Dampness to manilla ropes has been a problem because when ropes do not have the proper amount of moisture they lack the degree of firmness necessary for the best use of the same.

It is an object of the invention to provide a bag or container for ropes used as lariats or lassoes to keep the ropes dry and also to provide the container with a heating or other element for drying the rope within the container if the same should become desirable.

Another object of the invention is to provide a bag of polyethylene impregnated flexible canvas with a lid seal, which bag will contain and protect several ropes from the weather, the flexible polyethylene bag being practically indestructible so that it can be dropped, rolled, and even crushed without damage.

Other objects and advantages of the invention will be apparent from the following description taken in conjunction with the accompanying drawing in which:

FIG. 1 is an exploded perspective of a lariat bag and lid;

FIG. 2, a front elevation of the bag with the lid in place or closed;

FIG. 3, an enlarged fragmentary section on the line 3—3 of FIG. 2;

FIG. 4, an exploded perspective of a modified form of lariat container and cover;

FIG. 5, a fragmentary section of a reduced size of the structure of FIG. 4; and

FIG. 6, an enlarged removed section of a portion of FIG. 3.

Briefly stated the invention is a bag or container for ropes including those used for lariats in herding cattle and in performances for the entertainment of onlookers, such container having an attached handle for the transportation of the same and being of any desired configuration, as for example, cylindrical, with a relatively short axis, and with a wall held in place by a snap-on connection permitting it to be removed to allow access to the bag or container, such container also having a desiccating or drying element which may be in the nature of an electrical heating element incorporated in the walls of the bag for applying the necessary heat for drying and maintaining the desired temperature and humidity within the bag.

With continued reference to the drawing a portable container is provided for the storing and maintaining in proper moisture condition of rope 9, such container comprising a cylinder of relatively short axis with a base or bottom 10. The container may be of polyethelene impregnated canvas, leather, or other suitable material, with side wall structure 11 and a removable lid or detachable portion 12.

The bottom may be bonded or otherwise secured to the side wall structure 11 and the opposite edge of the side wall structure may have attached thereto a polyethylene or the like ring 13 having a peripheral recess 14 in its side and such ring may have an outer terminus 15.

The snap lid 12 have an intermediate portion of polyethylene impregnated canvas or the like to which is bonded a fastening ring 16 having a recess 17 in which the terminus 15 of the ring 13 is received and with an annular tongue 18 of a size to be snugly received within the recess 14 of the ring 13. The ring 16 has a marginal extremity 19 whereby the rings 13 and 16 may be engaged to provide a tight seal between the side wall and the lid structure of the container.

The side wall structure of the container comprises a pair of canvas layers 20 and 21 between which is received an electric heating element 22 with a sheet of insulation 23 including a reflective surface 24 for retaining and directing the heat toward the interior of the container. Electrical energy may be supplied from a battery, a power socket in an automobile or other structure, mobile or otherwise by means of conductors 25 having a variable temperature control 26. To the exterior of the container is bonded or otherwise attached a handle 27.

It will be apparent from the foregoing that a relatively simple inexpensive yet durable device is provided for the storing and maintenance of ropes used as lariats in a desired condition protected not only from the weather but from physical damage and such container is of a durability capable of withstanding rough handling.

In lieu of the container in FIGS. 1–3 and 6 a container of the character disclosed in FIGS. 4 and 5 may be employed, such container including a bottom 10', side wall structure 11' and a removable section 12'. The manner of attaching the lid to the container corresponds to that described in the preceding figures. Instead, however, of a drying agent in the form of a heating coil, the container may carry a desiccant or moisture absorbing substance 27 contained in a preferably cylindrical wall 28 having openings 29 for the circulation of air between the outer space 30 and the desiccant 27. In order that the top 12' may be readily applied it is provided with an air vent 31.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A cylindrical container for conditioning a rope lariat comprising an imperforate cylindrical outer wall, a bottom and a top defining an airtight chamber for receiving a coiled lariat, a drying element within the container having a cylindrical wall generally co-axial with the container wall and extending for substantially the full length of the container, and means for successively opening the container for insertion of a lariat therein and for closing the container when desired with an air and moisture proof seal, whereby a wet lariat can be inserted for drying by the adjacent cylindrical wall of the drying element but the moisture removed therefrom will be retained in the container to prevent excessive drying of the lariat.

2. The structure of claim 1 in which the cylindrical drying element is arranged radially outward of the lariat receiving chamber.

3. The structure of claim 1 in which the drying element includes an electric heating means and a temperature control unit.

4. The structure of claim 3 including a substance having a heat reflective surface arranged on the side of the heating element opposite the lariat receiving chamber, whereby heat is directed onto a lariat held therein.

5. The structure of claim 1 in which the container walls are made of two layers of polyethylene impregnated canvas having a cylindrical electrical heating element arranged between the layers and a cylindrical insulation layer having an inner heat reflective surface arranged between the said canvas layers outwardly of the heating element.

6. The structure of claim 1 in which the cylindrical drying element is arranged radially inwardly of the container walls to define a lariat receiving chamber between the drying element and the container wall.

7. The structure of claim 1 in which the cylindrical drying element is a hollow chamber containing a desiccant.

8. A portable container for receiving and conditioning a lariat, said container comprising a hollow generally cylindrical body of a relatively short axis including a removable closing, said body and cover having complementary annular contacting portions integral with substantially air and moisture proof interlocking means therebetween, at least one of which is yieldable and conformed to the other, and temperature and humidity modification means operatively associated with said container for maintaining the desired temperature and humidity within said container.

9. A container for holding and conditioning a lariat comprising walls defining a chamber for receiving the lariat, means for opening the container for the insertion of a lariat and for closing the container, an electric heater means mounted within the container for drying a lariat held therein, and a heat reflective surface mounted on the side of the electric heater for directing and concentrating heat on the lariat.

References Cited
UNITED STATES PATENTS

| | | | |
|---|---|---|---|
| 2,586,775 | 2/1952 | Benner et al. | 215—41 |
| 2,671,707 | 3/1954 | Lombard | 312—31 |
| 2,674,509 | 4/1954 | Barnet | 312—31 |
| 2,771,333 | 11/1956 | Eberle | 312—31 |
| 2,789,717 | 4/1957 | Demke | 215—41 |
| 2,821,448 | 1/1958 | Bender | 312—31 |
| 3,223,619 | 12/1965 | Calmon et al. | 210—37 |
| 3,265,530 | 8/1966 | Marzoccki et al. | 161—203 |

MORRIS O. WOLK, *Primary Examiner.*

E. G. WHITBY, B. S. RICHMAN, *Assistant Examiners.*